July 19, 1932.   J. W. LUCAS   1,868,014
EXPANSION JOINT
Filed March 20, 1929
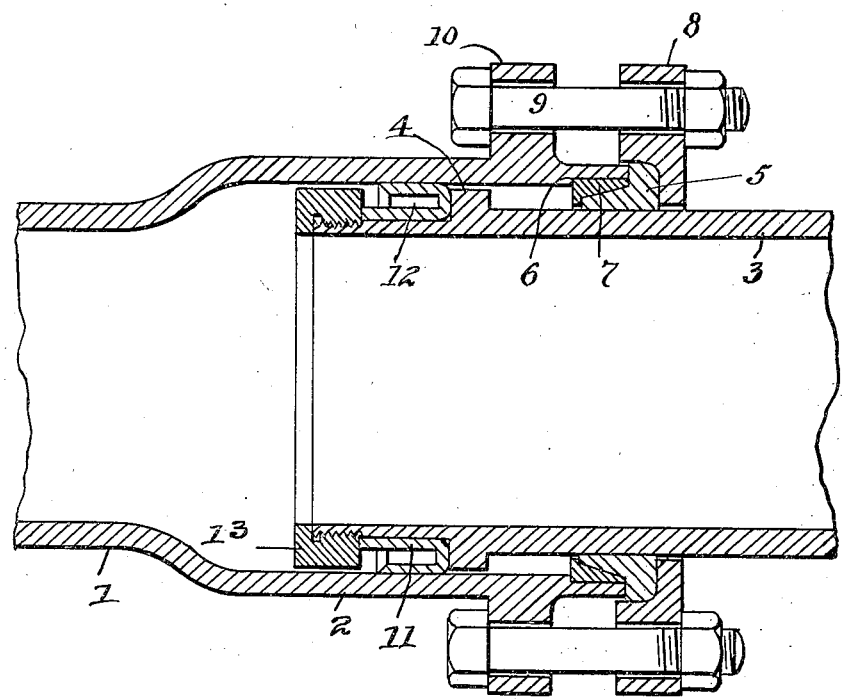
Inventor
John W. Lucas
By Lyon & Lyon
Attorneys Patented July 19, 1932

1,868,014

UNITED STATES PATENT OFFICE

JOHN W. LUCAS, OF LOS ANGELES, CALIFORNIA

EXPANSION JOINT

Application filed March 20, 1929. Serial No. 348,449.

This invention relates to expansion joints such as are used on pipe lines in situations where some allowance must be made for contraction and expansion in the pipe line. As usually constructed expansion joints allow free telescoping movement of the two connected pipe sections at the joint, but no provision is made for preventing an undue amount of expansion from dislodging the inner pipe from the outer pipe. For this reason it is necessary to construct these joints of considerable length.

The general object of this invention is to provide a simple construction for an expansion joint which will allow for the necessary movements at the joint, but which is so constructed as to prevent any possibility of the joint blowing out from an abnormally high pressure.

A further object of the invention is to provide an expansion joint of this kind with means to facilitate the repacking of the joint without shutting off the steam or liquid passing through the pipe line.

Further objects of the invention will appear hereinafter.

The invention consists of the novel parts and combination of parts to be described hereinafter, all of which contribute to produce an efficient expansion joint.

A preferred embodiment of the invention is described in the following specification, while the broad scope of the invention is pointed out in the appended claims.

The drawing is a vertical section through an expansion joint embodying my invention, the pipes which are connected by the joint being broken away.

In practicing the invention I provide the outer pipe 1 of the joint with a neck 2 of enlarged diameter at the end where the expansion joint is to be formed. This neck 2 receives the adjacent end of the inner pipe 3 of the expansion joint, and this pipe within the neck is formed with a shoulder 4, preferably of annular form, extending around the outer side of the pipe 3. This shoulder or collar 4 is of slightly less diameter than the inner diameter of the neck. The joint is preferably packed by an outer packing and an inner packing.

The outer packing consists of a packing ring 5 of substantially wedge-shaped cross section, the inner face of the packing being received upon a seat ring 7 seating upon an annular shoulder 6 that is located at the end of a counterbore in the end of the enlarged neck, thereby forming a seat for this packing ring in the extreme end of the neck 2. The packing ring 5 is held in place by means for securing it to the outer pipe section. This means is preferably in the form of a clamping ring 8 that fits against the outer face of the follower and is connected by bolts 9 to a flange 10 extending around on the outer side of the expanded neck 2.

The collar or shoulder 4 is located within the neck 2 at a considerable distance from the packing ring 5 so as to allow for contraction and expansion in the pipe line without coming against the packing ring 5. However, if the pressure within the pipe line should rise sufficiently to move the shoulder 4 up against the ring 7 the bolts 9 and the clamping ring 8 would prevent it from blowing out. In this way the expansion joint will operate safely with an abnormally high pressure. The packing ring 5 and seat ring are of wedge-form in cross-section and match together so that if the shoulder 4 seats against the seat ring it tightens the packing ring against the inner pipe 3.

In order to enable the packing ring 5 to be renewed whenever necessary, and also to give additional tightness at the joint, I provide a second or inner packing ring 11, which ring may be in the form of a cup leather constructed with an open inner chamber 12 to which the pressure within the pipe line is admitted. The pressure holds the folds of the packing ring 11 against the adjacent pipe walls and insures a tight joint. This packing ring 11 is preferably not clamped at its edge, but is located on the side of the shoulder 4 remote from the packing ring 5 and is held in place between the face of the shoulder 4 and a follower ring 13 that is screwed onto the threaded end of the inner pipe 3. In other words, the edges of the cup leather are free, and its ends simply abut against the shoulder and the follower ring 13, to retain the cup leather.

It will be evident that the inner packing ring will retain the pressure within the pipes and enable the outer packing ring to be removed and another packing ring substituted for it whenever this becomes necessary.

It is understood that the embodiment of the invention described herein is only one of the many embodiments this invention may take, and I do not wish to be limited in the practice of the invention, nor in the claims, to the particular embodiment set forth.

What I claim is:

1. In an expansion joint, the combination of an outer pipe having a neck of enlarged diameter at one end, and an inner pipe having its end received within the neck to slide freely through the same and having a shoulder on the same on its outer side located within the neck, said neck having a counterbore at its end, a packing ring seating in the outer end of the neck at said counterbore, a clamping ring outside of the packing ring, an inner packing ring of cup-leather form on the inner end of the inner pipe on the side of said shoulder remote from the first named packing ring and operating to prevent leakage at the joint when the first named packing ring is being replaced, a removable follower ring for retaining the second named packing ring, said inner packing ring having its edges free and having its ends abutting against the shoulder and the follower ring.

2. In an expansion joint, the combination of an outer pipe having a neck of enlarged diameter at one end and an inner pipe having its end received within the enlarged neck to slide freely through the same, and having an outwardly projecting integral shoulder at an intermediate point of its length located within the enlarged neck, a seat ring in the end of the outer pipe, a packing ring in the outer end of the neck seating on the seat ring, a clamping ring engaging the outer side of the packing ring, said neck having a flange on its outer side with bolts for securing the said clamping ring to the same, said shoulder being located at a point removed from the packing ring to permit free expansion and contraction movements of the pipes relative to each other, and operating in the extreme extended position of the joint, to exert pressure on the packing ring and hold the packing ring tight, a single inner packing ring of cup leather form on the inner end of the inner pipe with its edges free and having its outer end abutting against the shoulder, said inner packing ring having a fold lying against the inner face of the enlarged neck and having an inner fold lying against the outer face of the inner pipe, and a follower ring screwed onto the inner end of the inner pipe and abutting the inner end of the inner packing ring to retain the same between the follower ring and said shoulder.

Signed at Los Angeles, California, this 27th day of February, 1929.

JOHN W. LUCAS.